INVENTOR
ELMER W. ROBERTSON
BY
ATTORNEY

United States Patent Office 3,380,124
Patented Apr. 30, 1968

3,380,124
DEVICE FOR GUIDING TIRE CASINGS ON CURING RIMS
Elmer W. Robertson, 6965 Park Blvd., Oakland, Calif. 94611
Filed Apr. 28, 1965, Ser. No. 451,569
1 Claim. (Cl. 18—45)

ABSTRACT OF THE DISCLOSURE

Rim sections of collapsible curing rims are connected by hinge brackets extending from the meeting ends of adjacent rim sections and held together by a transverse pivot pin. The hinge brackets consist of spaced parallel lug flanges on one meeting end being spaced wider apart than parallel lug flanges on the other meeting end so that the latter fit between the former lug flanges. The more widely spaced lug flanges extend to a considerable length from the pivot pin and have outwardly curved flanges spaced apart sufficiently far to take up all the slack between the rim and the tire casing thereby to hold the tire casing firm and rigid; these guide flanges space the tire casing away from the sides of the hinge, thereby guiding the tire casing so as to be properly centered, prevent damage to the tire casing, and, by taking up the slack, hold the tire casing rigid and properly centered in the mold without distortion.

---

Collapsible rims are made of hinged sections and are formed with concave outer periphery to nest the curing tube within a tire casing during treading or retreading or recapping operations.

During these operations it is necessary to manipulate the tire around the convex side or inside of the collapsible rim. One particular operation is the contracting of the beads of the tire casing thereby to reduce the diameter of the tire casing for insertion into or removal from a full circle mold. During such manipulations the beads are drawn against the edges of the inwardly projecting parts of the connecting hinges between the collapsible rim sections and the tire casing is frequently damaged thereby.

In previous attempts to protect the tire casing from damage, shields or guides were provided to extend inwardly beyond the hinges for spacing the tire beads from the projecting parts of the hinges. This required the manipulation of drawing of the tire further away from the convex inner periphery of the collapsible rim.

The primary object of the invention is to provide means for reducing the outer diameter of a tire casing on a curing rim and for protecting the tire casing against direct contact with the parts of the hinges of collapsible rims by guides extending laterally outwardly from parts of the hinge and which do not project radially inwardly beyond the respective hinge parts, thereby to guide the inner periphery of the tire beads and the tire casing during manipulation comparatively close to the inner periphery of the collapsible rim yet effectively prevent contact of the tire casing with the edges or corners of hinge brackets or pivot pins, and to guide the beads of the tire casing when pressed together so as to reduce the outer diameter of the tire casing.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein.

Figure 1:
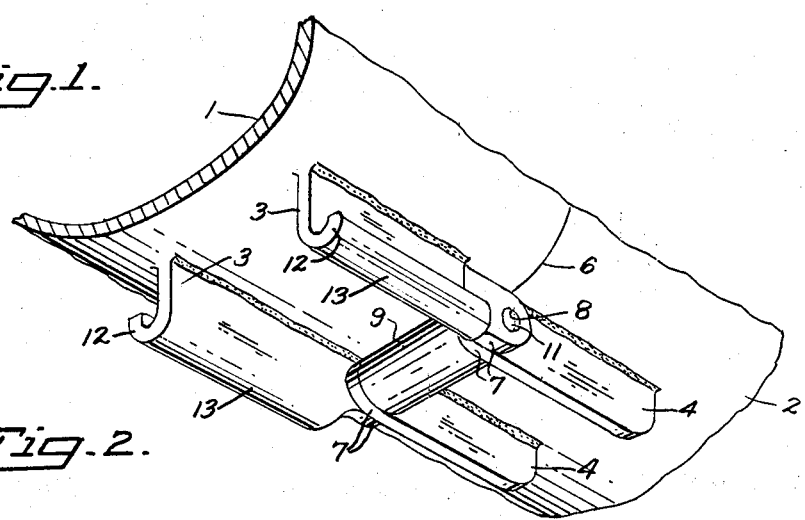
FIG. 1 is a fragmental view of a collapsible rim at the joining parts of adjacent rim sections, showing the guides at the hinge.
Figure 2:
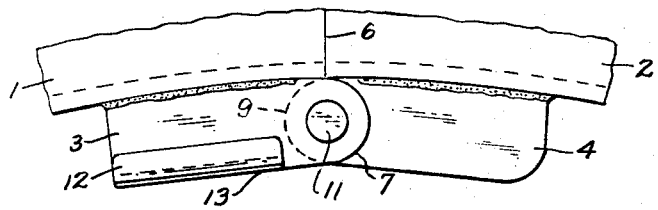
FIG. 2 is a side view of the collapsible rim and one of its hinges with the tire guide.

Rim sections 1 and 2 in this illustrative embodiment have parallel hinge brackets 3 and 4 respectively. The hinge brackets 3 and 4 are suitably fixed for instance by welding so that they are generally parallel. The respective brackets 3 and 4 project beyond the adjacent ends 6 of the rim sections 1 and 2 so that the projecting bearing portions 7 overlap and the axis of the bearing holes 8 therein is in registry with the joining ends 6 of rim sections 1 and 2. A spacer bushing or sleeve 9 is provided between the brackets 4, which latter brackets are nearer together than outer brackets 3, so as to extend between the ends of the outer brackets 3 as shown in FIG. 1. As usual pivot pin 11 extends through the bearing holes 8 of the respective bearings 7 and through the bushing 9.

The protective lateral guides in the herein illustration are in the form of outwardly curved flanges 12 on the outer edge of each bracket 3. The outwardly curved guide flanges 12 extend the entire length of the bracket 3 up to but not over the bearing portions 7.

It is essential that the rounded or curved top 13 of each flange 12 shall be at the same level as the top edges of the hinge brackets 4 and of the bearing portions 7 and that they do not project radially beyond the height of the hinge, but project only laterally outwardly from each of the bearing brackets 3 thereby to space the beads or the inner surface of the tire casing 14 laterally away from the sides of the hinges of the collapsible rim.

Figure 3:
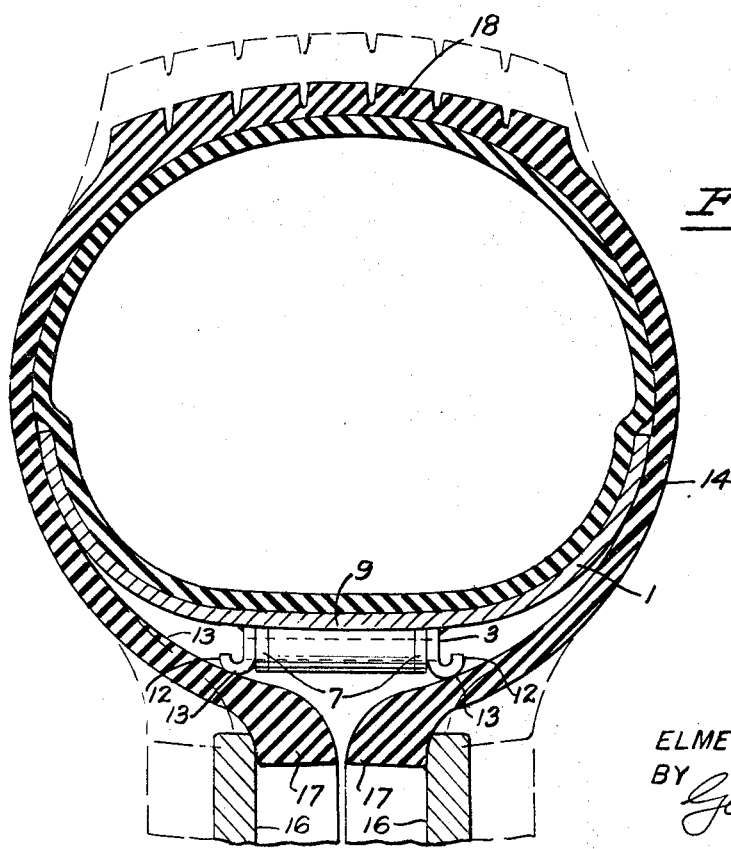
FIG. 3 is a cross-sectional view of the collapsible rim showing the guides in co-action with the pressure plates bearing against the beads of a tire casing.

As shown in FIG. 3, in the operation of inserting the tire casing into the matrix of a tire mold, pressure plates 16, shown in broken lines, are utilized to press the beads 17 of the tire casing 14 together, thereby to reduce the outer diameter of the crown 18 of the tire casing 14. After the tire casing 14 is placed within the matrix, the pressure plates 16 are moved apart, allowing the beads 17 to spring apart and thereby to expand radially the tire casing 14 into the matrix, the crown 18 of the tire casing 14 being then in the position indicated by broken lines in FIG. 3. The lateral guide flanges 12 and especially the rounded outer portions 13 are symmetrical and thereby also aid in centering the beads 17 and the tire casing 14 on the collapsible rim. Thus the curved outwardly extending guide flanges serve the double function of preventing damage to the tire casing from the hinges of the collapsible rim and also to guide the beads of the tire casing in properly centered position on the rim.

It is also an important function of the guide flanges 12 to cooperate with the pressure plates 16 and with the edges of the inside curing rim in reducing the outer diameter of the tire casinng. The pressure plates 16 press the beads 17 together over the rounded surfaces 13 of the guide flanges 4, and thereby reduce the outside diameter of the tire casing. The steps in this method are the placing of the curing rim with the curing tube thereon within the tire casing; providing internally extended pairs of tire guides spaced transversely of the rim and projecting radially inwardly of the rim having rounded parallel guide surfaces, several such pairs of guides being circumferentially spaced around the inner circumference of the rim, preferably at each hinge of a collapsible rim; applying pressure to the beads of the tire casing so as to pull the beads and the adjacent portion of the tire casing laterally and radially inwardly against and over the symmetrical guide surfaces, thereby to reduce the outer diameter of the tire casing for insertion into or ejection from a mold.

I claim:
1. In a collapsible sectional curing rim for tire casings in curing molds, said tire casings having beads,
   (a) a plurality of rim sections complementing each other end to end into a full circle rim,
   (b) a pair of parallel brackets extended from the inner periphery of each rim section at said ends of said section,
   (c) overlapping bearings extended from the adjacent ends of said brackets over and beyond said ends of said rim sections, said overlapping bearings having aligned bearing holes,
   (d) a pivot pin in said bearing holes, pivotally connecting said hinge brackets,
   (e) the improvement of guide flanges on the radially innermost edges of at least one pair of said brackets, said guide flanges curving laterally outwardly and then back toward the rim section, the curved portions of said guides being substantially in registry with the radially innermost edges and portions of said brackets and parts of said hinges, and the lateral portions of said guide flanges being in planes symmetrically spaced beyond the ends of said hinge pivot, at a sufficient distance for spacing the beads of the tire casing from the sides of said hinge brackets and from the ends of said pivot pin and for thereby centering the beads of said tire casing rigidly when pressed together for insertion into or removal from a curing mold.

References Cited
UNITED STATES PATENTS

| | | | |
|---|---|---|---|
| 2,724,861 | 11/1955 | Cox et al. | 18—45 X |
| 2,848,745 | 8/1958 | Morris | 18—45 |
| 2,968,839 | 1/1961 | Nester | 18—45 |
| 3,162,905 | 12/1964 | Robertson | 18—45 |
| 3,164,865 | 1/1965 | Dennis et al. | 18—45 |

J. HOWARD FLINT, JR., Primary Examiner.